United States Patent
Barton et al.

(10) Patent No.: US 8,627,461 B2
(45) Date of Patent: Jan. 7, 2014

(54) SYSTEM, METHOD, AND COMPUTER PROGRAM PRODUCT FOR VERIFYING AN IDENTIFICATION OF PROGRAM INFORMATION AS UNWANTED

(75) Inventors: Christopher Barton, Buckingham (GB); Guy William Welch Roberts, Milton Keynes (GB); Igor G. Muttik, Berkhamsted (GB); Alexander James Hinchliffe, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 584 days.

(21) Appl. No.: 12/398,073

(22) Filed: Mar. 4, 2009

(65) Prior Publication Data
US 2013/0276106 A1 Oct. 17, 2013

(51) Int. Cl.
*H04L 29/06* (2006.01)

(52) U.S. Cl.
USPC .......................................................... 726/22

(58) Field of Classification Search
USPC ........................................ 726/22–25; 722/22
See application file for complete search history.

(56) References Cited

U.S. PATENT DOCUMENTS

| | | | |
|---|---|---|---|
| 6,697,948 B1 | 2/2004 | Rabin et al. | |
| 6,708,212 B2 | 3/2004 | Porras et al. | |
| 6,981,155 B1 | 12/2005 | Lyle et al. | |
| 7,095,716 B1 | 8/2006 | Ke et al. | |
| 7,409,712 B1 | 8/2008 | Brooks et al. | |
| 7,512,911 B1 | 3/2009 | Goren et al. | |
| 7,512,977 B2 | 3/2009 | Cook et al. | |
| 7,752,667 B2 | 7/2010 | Challener et al. | |
| 7,945,787 B2 | 5/2011 | Gassoway | |
| 2004/0042416 A1 | 3/2004 | Ngo et al. | |
| 2004/0054925 A1* | 3/2004 | Etheridge et al. | 713/201 |
| 2004/0073810 A1 | 4/2004 | Dettinger et al. | |
| 2004/0123117 A1* | 6/2004 | Berger | 713/188 |
| 2004/0203589 A1 | 10/2004 | Wang et al. | |
| 2005/0015455 A1 | 1/2005 | Liu | |
| 2005/0027818 A1 | 2/2005 | Friedman et al. | |
| 2005/0065899 A1 | 3/2005 | Li et al. | |
| 2005/0262576 A1 | 11/2005 | Gassoway | |
| 2006/0036693 A1 | 2/2006 | Hulten et al. | |
| 2006/0070130 A1 | 3/2006 | Costea et al. | |
| 2006/0150256 A1 | 7/2006 | Fanton et al. | |

(Continued)

FOREIGN PATENT DOCUMENTS

| | | | |
|---|---|---|---|
| WO | WO2008089626 | * | 7/2008 |
| WO | 2011082084 A2 | | 7/2011 |
| WO | 2011082084 A3 | | 10/2011 |

OTHER PUBLICATIONS

An Architecture for Generating Semantics-Aware Signatures; Vinod Yegneswaran, Jonathon T. Griffin, Paul Barford, Somesh Jha; Appeared in Proceedings of Usenix Security Symposium 2005, all pages.

(Continued)

*Primary Examiner* — Kambiz Zand
*Assistant Examiner* — Ghodrat Jamshidi
(74) *Attorney, Agent, or Firm* — Wong, Cabello, Lutsch, Rutherford & Brucculeri, LLP

(57) ABSTRACT

A system, method, and computer program product are provided for verifying an identification of program information as unwanted. In use, program information is identified as unwanted at a client. Furthermore, the identification of the program information as unwanted is verified, utilizing a communication between the client and a server.

18 Claims, 5 Drawing Sheets

(56) References Cited

U.S. PATENT DOCUMENTS

| | | | |
|---|---|---|---|
| 2006/0242245 | A1 | 10/2006 | Christensen |
| 2007/0016953 | A1 | 1/2007 | Morris et al. |
| 2007/0028304 | A1 | 2/2007 | Brennan |
| 2007/0073660 | A1 | 3/2007 | Quinlan |
| 2007/0079379 | A1 | 4/2007 | Sprosts et al. |
| 2007/0226804 | A1* | 9/2007 | Somkiran et al. ............... 726/24 |
| 2007/0240217 | A1 | 10/2007 | Tuvell et al. |
| 2007/0240220 | A1 | 10/2007 | Tuvell et al. |
| 2007/0261112 | A1 | 11/2007 | Todd et al. |
| 2008/0126779 | A1 | 5/2008 | Smith |
| 2008/0141373 | A1 | 6/2008 | Fossen et al. |
| 2008/0168533 | A1 | 7/2008 | Ozaki et al. |
| 2008/0196099 | A1 | 8/2008 | Shastri |
| 2008/0295177 | A1* | 11/2008 | Dettinger et al. ............... 726/24 |
| 2008/0313738 | A1 | 12/2008 | Enderby |
| 2009/0044024 | A1 | 2/2009 | Oberheide et al. |
| 2009/0064329 | A1* | 3/2009 | Okumura et al. ............... 726/22 |
| 2009/0088133 | A1 | 4/2009 | Orlassino |
| 2009/0097661 | A1 | 4/2009 | Orsini et al. |
| 2009/0254992 | A1 | 10/2009 | Schultz et al. |
| 2010/0031358 | A1 | 2/2010 | Elovici et al. |
| 2011/0047618 | A1 | 2/2011 | Evans et al. |
| 2011/0138465 | A1 | 6/2011 | Franklin et al. |

OTHER PUBLICATIONS

Christodorescu, Miha et al. "Testing Malware Detectors" in the Proceedings of the ACM SIGSOFT International Symposium on Software Testing and Analysis (ISSTA '04), vol. 29, Issue 4, Jul. 11-14, 2004, Boston, Massachusetts, 11 pages.

VMware DiskMount Utility: User's Manual, http://www.vmware.com/pdf/VMwareDiskMount.pdf, 1998-2005, Revision Apr. 8, 2005, Vmware, Inc., 6 pages.

Wolf, Chris, Column: "Virtual Server 2005 R2 SPI Treasures: VHD Mount", Jun. 2007, Microsoft Certified Professional Magazine Online, Download on Feb. 27, 2008 from http://mcpmag.com/columns/article.asp?EditorialsID=1793 pp. 1-5.

"chroot(2)—Linux man page", Downloaded on Feb. 27, 2008 from http://linux.die.net/man/2/chroot pp. 1-2 D.

"Linux/Unix Command: chroot", Downloaded on Feb. 27, 2008 from http://linux.about.com/library/cmd/blcmdl2_chroot.htm pp. 1-3.

"Blacklist", Wikipedia, last modified Jun. 5, 2008, Wikipedia Foundation, Inc. Downloaded from http://en.wikipedia.org/wiki/Blacklist , pp. 1-3.

U.S. Appl. No. 11/946,777, filed Nov. 28, 2007.

Non-Final Office Action, dated Jan. 5, 2011 for U.S. Appl. No. 11/946,777.

Final Office Action, dated Jun. 13, 2011 for U.S. Appl. No. 11/946,777.

U.S. Appl. No. 12/111,846, filed Apr. 29, 2008.

Non-Final Office Action, dated Jun. 24, 2011 for U.S. Appl. No. 12/111,846.

Final Office Action, dated Nov. 15, 2011 for U.S. Appl. No. 12/111,846.

U.S. Appl. No. 12/050,432, filed Mar. 18, 2008.

Non-Final Office Action dated Oct. 6, 2010 for U.S. Appl. No. 12/050,432.

Final Office Action dated May 13, 2011 for U.S. Appl. No. 12/050,432.

U.S. Appl. No. 12/131,383 filed Jun. 2, 2008.

Non-Final Office Action dated Jun. 24, 2011 for U.S. Appl. No. 12/131,383.

Final Office Action dated Oct. 17, 2011 for U.S. Appl. No. 12/131,383.

U.S. Appl. No. 12/144,967 filed Jun. 24, 2008.

Non-Final Office Action dated Mar. 3, 2011 for U.S. Appl. No. 12/144,967.

Final Office Action dated Aug. 17, 2011 for U.S. Appl. No. 12/144,967.

International Preliminary Report received for PCT Patent Application No. PCT/US2010/061889, issued on Jul. 4, 2012, 4 pages.

International Search Report received for PCT Patent Application No. PCT/US2010/061889, mailed on Aug. 29, 2011, 3 pages.

* cited by examiner

SYSTEM, METHOD, AND COMPUTER PROGRAM PRODUCT FOR VERIFYING AN IDENTIFICATION OF PROGRAM INFORMATION AS UNWANTED

FIELD OF THE INVENTION

The present invention relates to security systems, and more particularly to security systems that identify code and/or data as unwanted.

BACKGROUND

Traditionally, security systems have been utilized for detecting unwanted data and/or code (e.g. malware, etc.). Oftentimes, the security systems employ signatures of previously detected unwanted code and/or data, heuristics, etc. for detecting unwanted code and/or data. However, techniques used by traditional security systems to detect unwanted code and/or data have generally exhibited various limitations. Just by way of example, such signatures, heuristics, etc. used by traditional security systems are generally susceptible to causing false positive identifications of unwanted code and/or data.

There is thus a need for addressing these and/or other issues associated with the prior art.

SUMMARY

A system, method, and computer program product are provided for verifying an identification of program information as unwanted. In use, program information is identified as unwanted at a client. Furthermore, the identification of the program information as unwanted is verified, utilizing a communication between the client and a server.

DETAILED DESCRIPTION

Figure 1:
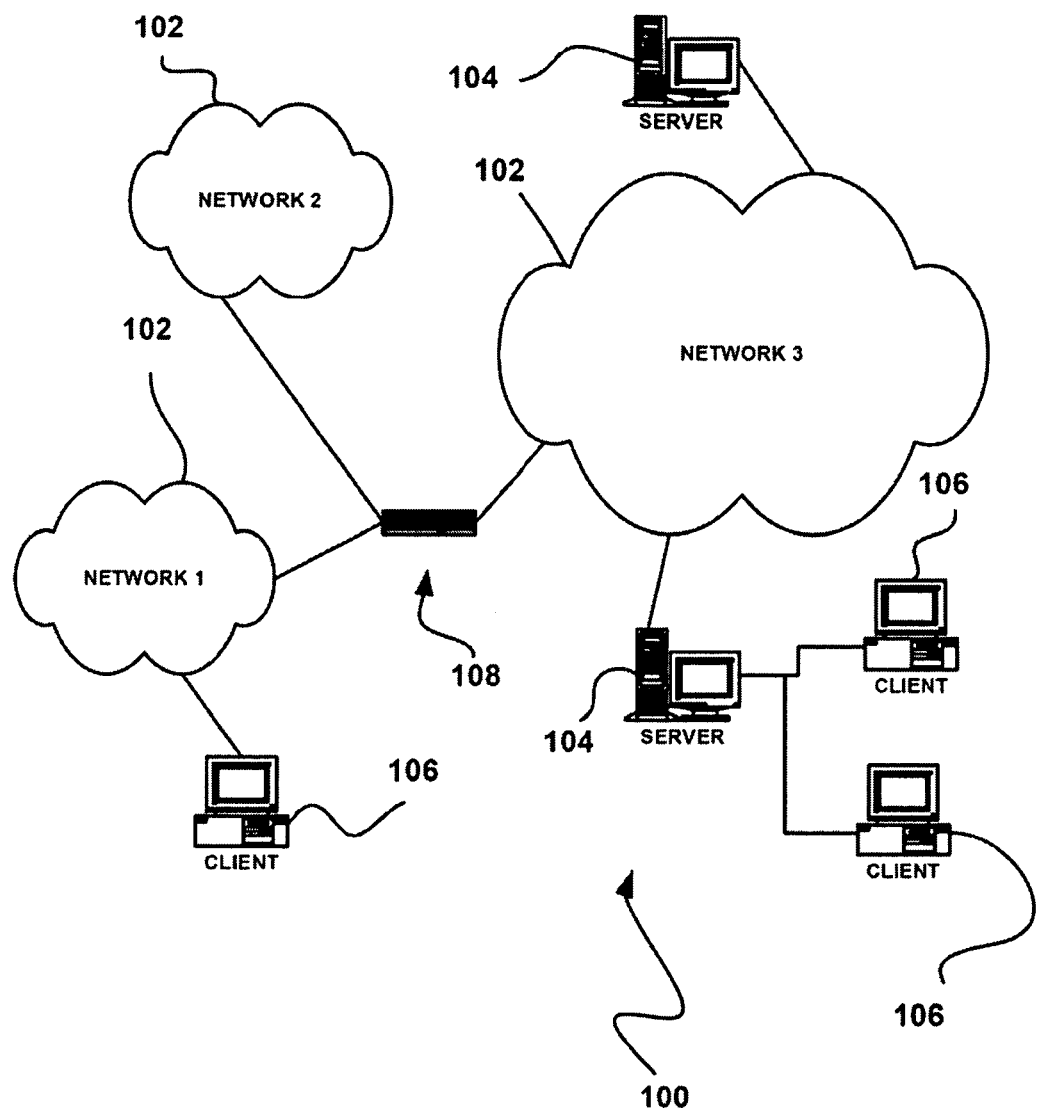
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
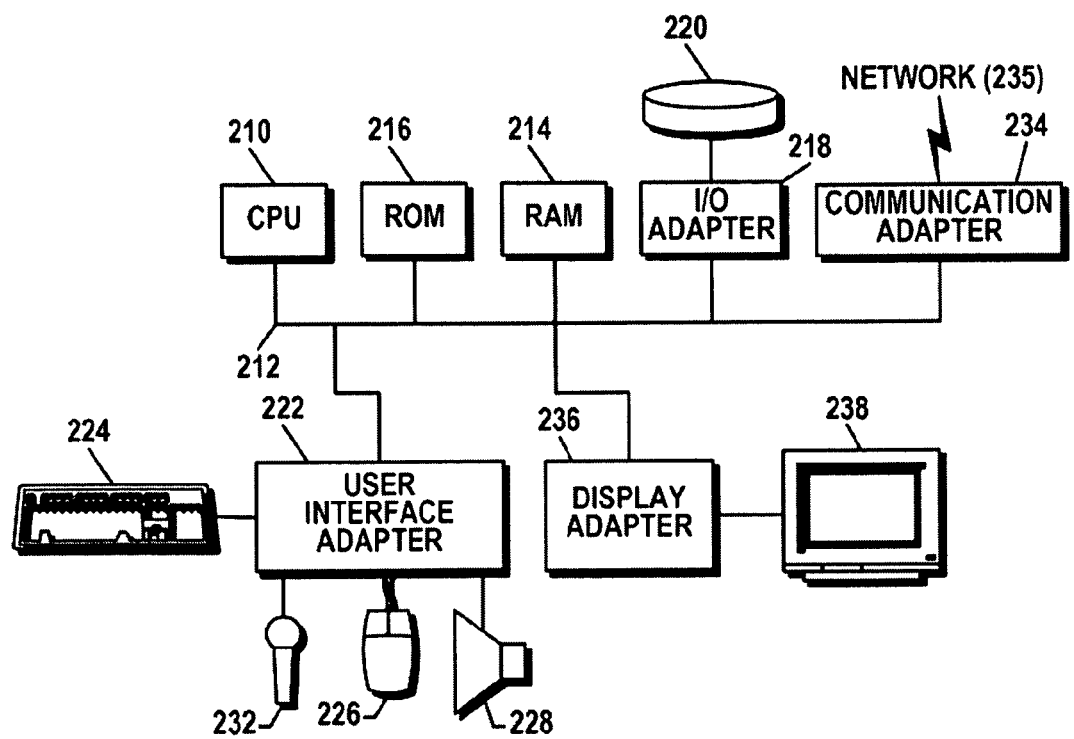
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
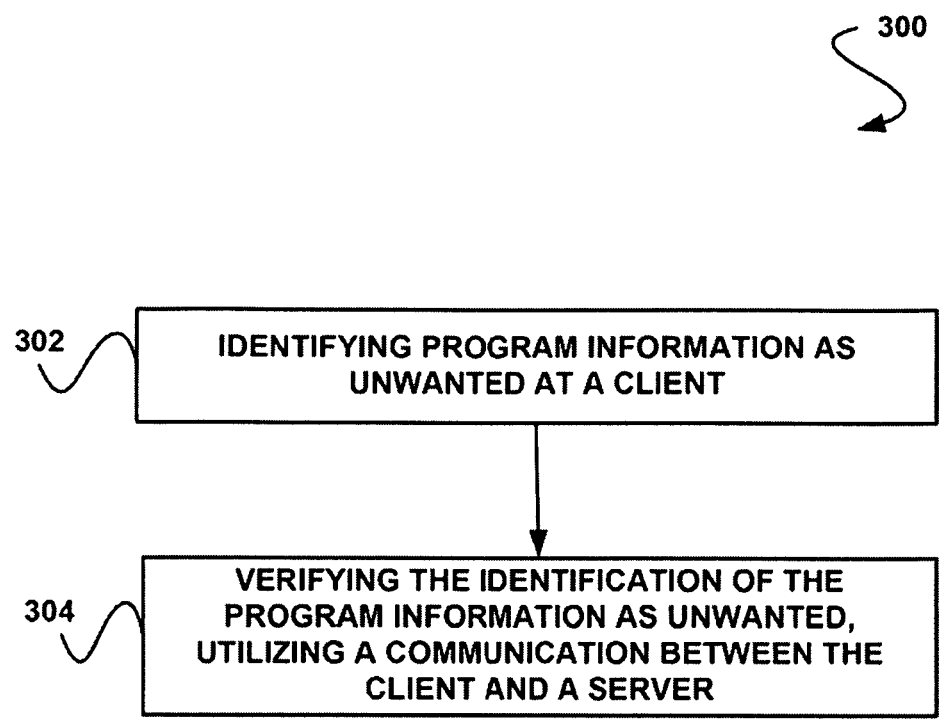
FIG. 3 shows a method for verifying an identification of program information as unwanted, in accordance with one embodiment.

FIG. 3 shows a method 300 for verifying an identification of program information as unwanted, in accordance with one embodiment. As an option, the method 300 may be carried out in the context of the architecture and environment of FIGS. 1 and/or 2. Of course, however, the method 300 may be carried out in any desired environment.

As shown in operation 302, program information is identified as unwanted at a client. With respect to the present description, the program information may include any type of code and/or data capable of being identified as unwanted. For example, the program information may include a file, an application, computer code, etc.

In one embodiment, the program information may be stored on the client. Of course, however, the program information may be accessible to the client in any manner capable of allowing the client to identify the program information as unwanted. It should be noted that the client may include any device and/or logic that is operable to identify program information as unwanted. Optionally, the client may include any of the devices described above with respect to FIGS. 1 and/or 2.

In another embodiment, the client may include a security system for identifying the program information as unwanted. Such security system may include a firewall, an anti-virus scanner, an anti-spyware scanner, etc. To this end, identifying the program information as unwanted may include identifying the program information as malware, spyware, adware and/or any other type of program information which is unwanted.

As an option, the program information may be identified as unwanted utilizing a driver. With respect to the present description, the driver may include any information capable of being utilized to identify the unwanted program information, including, but not limited to, any routine script or logic within an engine (e.g. an anti-virus engine). In one embodiment, the driver may include a signature of known unwanted program information (e.g. program information previously determined to be unwanted). In another embodiment, the driver may include behavioral characteristics, activity, etc. indicative of unwanted program information.

In yet another embodiment, the driver may be manually configured. For example, an administrator (e.g. of a security system provider, etc.) may define the driver, create the driver, etc. Accordingly, the driver may be applied (e.g. compared, etc.) to the program information for identifying the program information as unwanted.

Furthermore, the identification of the program information as unwanted is verified, utilizing a communication between the client and a server, as shown in operation 304. With respect to the present description, the server may include any device that is separate from the client via which a communication with the client may be utilized for verifying the identification of the program information as unwanted. Just by way of example, the server may include any of the devices described above with respect to FIGS. 1 and/or 2. As an option, the server and the client may be in communication over a network (e.g. such as any of the networks described above with respect to FIG. 1).

In one embodiment, the server may be associated with a security system provider. For example, the server may be provided by, managed by, etc. the security system provider. Thus, a security system provider that optionally provides the driver to the client for identifying the program information as unwanted may also provide the server via which the identification of the program information as unwanted may be verified, as an option.

In one embodiment, the verification of the identification of the program information as unwanted may be performed utilizing a whitelist. The whitelist may optionally include a predetermined list of drivers for which identifications of program information as unwanted are to be prevented from being verified. For example, the whitelist may include drivers predetermined to at least potentially be associated with false positive identifications of program information as unwanted (e.g. identifications of program information as unwanted when the program information is not actually unwanted). As another example, the whitelist may include drivers predetermined to be modified in any unwanted manner (e.g. by malware, etc.). As an option, the whitelist may be stored on the server.

As another option, the whitelist may include drivers made available for use by the client (e.g. provided by the security system provider, stored on the client, etc.) within a predetermined period of time. The predetermined period of time may include the last day, week, month, etc. Just by way of example, drivers made available within the predetermined period of time may be considered to be newly available drivers for which it is unknown whether such drivers result in false positive identifications of program information as unwanted.

As yet another option, the whitelist may include drivers of a type predetermined to be at least potentially associated with false positive identifications of program information as unwanted. For example, the whitelist may include drivers that include behavioral characteristics, activity, etc. indicative of unwanted program information (e.g. drivers that employ heuristics for identifying program information as unwanted). Of course, it should be noted that the whitelist may include any list of drivers capable of being utilized to verify the identification of the program information as unwanted.

In one embodiment, the verification may include transmitting an identification of a driver utilized by the client to identify the program information as unwanted with the communication between the client and the server. Optionally, identification of the driver may include a name of the driver, a fingerprint of the driver, a checksum of the driver, etc. In another embodiment, the verification may include comparing the identification of the driver with the whitelist (e.g. at the server).

In yet another embodiment, the communication between the client and the server that is utilized for verifying the identification of the program information as unwanted may include receiving a response from the server (e.g. at the client). Such response may optionally include a result of the comparison of the identification of the driver with the whitelist. For example, if it is determined that the identification of the driver is included in the whitelist, the response may indicate that the driver is not verified. As another example, if it is determined that the identification of the driver is not included in the whitelist, the response may indicate that the driver is verified.

In this way, the client may utilize the response from the server for verifying the identification of the program information as unwanted. Of course, it should be noted that while various embodiments of verifying the identification of the program information as unwanted have been described hereinabove, it should be noted that such identification may be verified in any desired manner that utilizes a communication between the client and the server. In one embodiment, if the response indicates that the driver is not verified, the client may not verify the identification of the program information as unwanted. In another embodiment, if the response indicates that the driver is verified, the client may verify the identification of the program information as unwanted.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
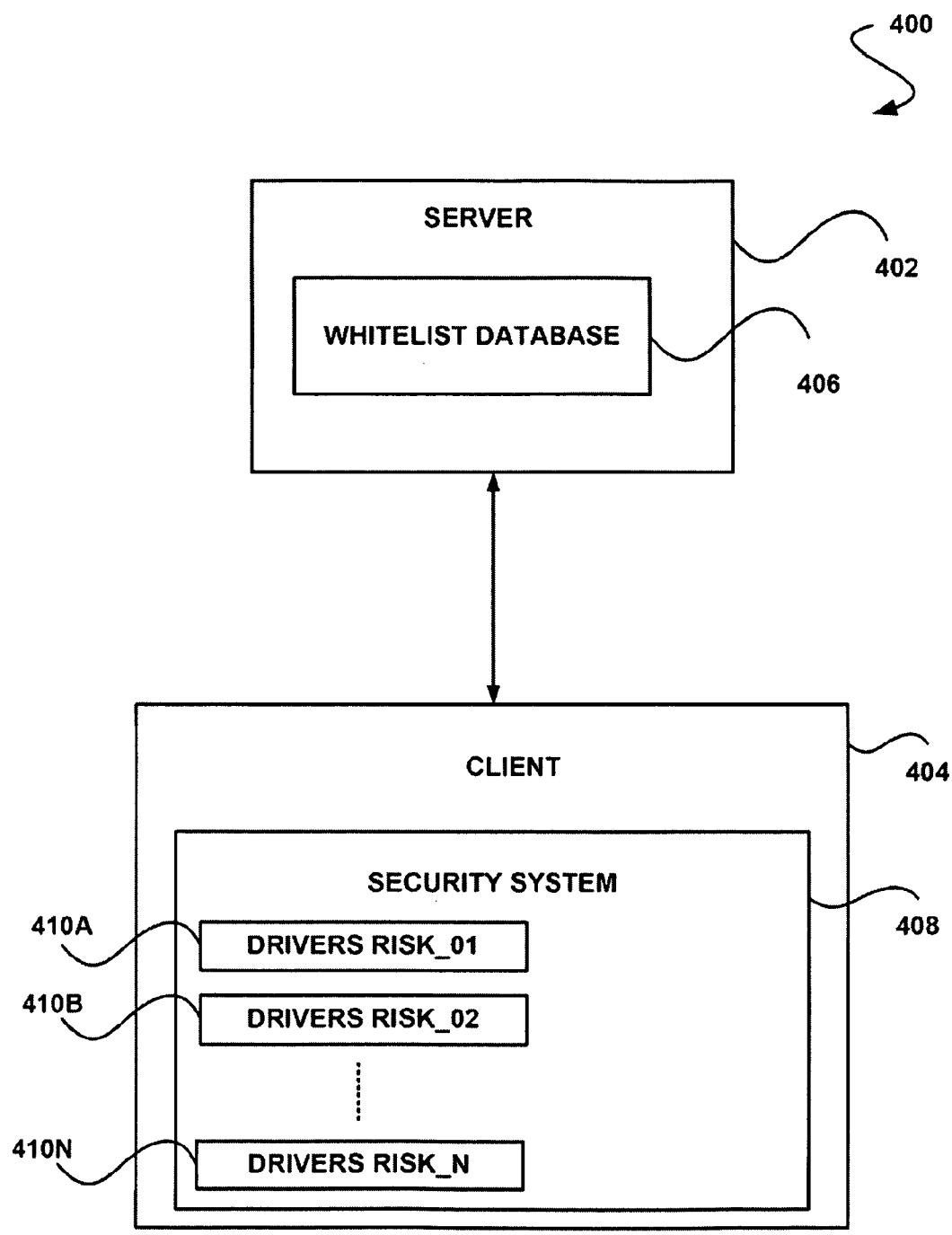
FIG. 4 shows a system for verifying an identification of program information as unwanted, in accordance with another embodiment.

FIG. 4 shows a system 400 for verifying an identification of program information as unwanted, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a server 402 is in communication with a client 404. In one embodiment, the server 402 and the client 404 may be in communication over a network (e.g. the Internet, wireless, mobile device networks, etc.). Of course, however, the server 402 and the client 404 may be in communication in any desired manner.

Additionally, the client 404 includes a security system 408. The security system 408 may include any system capable of being utilized to identify program information as unwanted. For example, the security system 408 may identify program information stored on the client 404 as unwanted.

In various embodiments, the security system 408 may include an anti-virus scanner, an anti-spyware scanner, etc. Accordingly, the security system 408 may scan the client 404 for unwanted program information. As an option, the security system 408 may be provided by (e.g. made available to the client 404 by, etc.) a security system provider associated with (e.g. managing, etc.) the server 402.

Further, the security system 408 includes a plurality of sets of drivers 410A-N. As shown, each set of drivers 410A-N is associated with a different degree of risk. For example, drivers in a first set of drivers 410A are associated with a first degree of risk, drivers in a second set of drivers 410B are associated with a second degree of risk, and so on. Each set of drivers 410A-N may optionally be flagged with a degree of risk associated therewith.

With respect to the present embodiment, the degree of risk may include a probability that an identification of program information as unwanted is a false positive identification. Thus, different sets of drivers 410A-N may be associated with different degrees of risk in false positive identifications. Just by way of example, the drivers in the first set of drivers 410A may be associated with a higher degree of risk than the drivers in the second set of drivers 410B, such that the drivers in the first set of drivers 410A may be more likely to produce false positive identifications of unwanted program information than drivers in the second set of drivers 410B.

The degree of risk for each driver may be determined manually, in one embodiment. For example, a user may manually assign a degree of risk to a driver. In another embodiment, the degree of risk for each driver may be determined automatically. As an option, the degree of risk may be automatically determined based on a characteristic of the driver, such as an age of the driver (e.g. a length of time the driver has been available for use in identifying program information as unwanted). As another option, the degree of risk may be automatically determined based on a type of analysis that resulted in the identification of the program information as unwanted, such as information included in the driver for use in identifying program information as unwanted (e.g. signature, behavioral, etc.).

In one embodiment, the security system 408 of the client 404 may compare program information to the drivers in the sets of drivers 410A-N for determining whether the program information is unwanted. To this end, the security system 408 of the client 404 may identify the program information as unwanted utilizing a driver in one of the sets of drivers 410A-N. For example, the security system 408 may compare the driver to the program information, such that detection of a match results in identification of the program information as unwanted.

In response to the identification of the program information as unwanted, the client 404 may determine a risk factor associated with the identification of the program information as unwanted. It should be noted that in other embodiments a server and/or any other device and/or logic may determine the risk factor. In one embodiment, the risk factor may be based on the degree of risk associated with the driver utilized to identify the program information as unwanted. For example, the risk factor may be a function of the type of analysis that resulted in the identification of the program information as unwanted, the age of the driver that resulted in the identification of the program information as unwanted, etc. Thus, the risk factor may indicate a risk that the identification of the program information as unwanted is a false positive identification.

Based on the risk factor, the client 404 may verify the identification of the program information as unwanted, utilizing a communication between the server 402 and the client 404. In one embodiment, if the risk factor meets a predetermined threshold risk factor, the client 404 may verify the identification of the program information as unwanted. In another embodiment, the client 404 may not verify the identification of the program information as unwanted if the risk factor is below the predetermined threshold risk factor, and thus may react to the identification of the program information as unwanted as desired (e.g. by performing a remedial action, etc.).

As an option, the client 404 may verify the identification of the program information as unwanted by communicating a request for such verification to the server 402. The request may include an identifier associated with the identification of the program information as unwanted (e.g. an identifier of the driver utilized to identify the program information as unwanted), in one embodiment. Thus, the identifier may be transmitted with the communication to the server 402. In response to receipt of the request, the server 402 may verify the identification of the program information as unwanted utilizing a whitelist database 406 stored on the server 402. It should be noted that while a whitelist database 406 is shown, the whitelist may be provided in any desired type of data structure (e.g. a list, etc.). The whitelist database 406 may store identifiers of drivers predetermined to be associated with (e.g. predetermined to generate, etc.) false positive identifications of unwanted program information, for example.

Thus, the server 402 may compare the identifier of the driver received from the client 404 with the whitelist database 406. If, based on the comparison, the server 402 determines that the identifier of the driver received from the client 404 is not in the whitelist database 406, the server 402 may respond to the client 404 indicating that the identification of the program information as unwanted is verified. If, however, based on the comparison, the server 402 determines that the identifier of the driver received from the client 404 is in the whitelist database 406, the server 402 may respond to the client 404 indicating that the identification of the program information as unwanted is not verified. To this end, the client 404 may optionally verify the identification of the program information as unwanted based on the response received from the server 402.

As an option, the server 402 may periodically update the drivers in the sets of drivers 410A-N stored on the client 404. In one embodiment, such update may be based on the whitelist database 406. For example, the server 402 may provide updated sets of drivers to the client 404, where such updated sets of drivers exclude the drivers included in the whitelist database 406. Further, in response to updating the sets of drivers at the client 404, the server 402 may remove the identifiers of drivers included in the whitelist database 406.

As another option, the server 402 may log information associated with the program information that is received from the client 404 and/or any other client in communication with the server 402. In one embodiment, the server 402 may log each identification of program information as unwanted for which a request for verification is received at the server 402 (e.g. by a plurality of clients). Thus, the program information identified as unwanted (or optionally a fingerprint thereof) may be logged. In another embodiment, an aggregation of such logs may be utilized for analysis purposes.

In yet another embodiment, the information may indicate the driver utilized to identify the program information as unwanted. Moreover, the server 402 may initiate an analysis of the driver utilized to identify the program information as unwanted. Such analysis may include a manual analysis, for example. As an option, the analysis may include determining whether the driver is making false positive identifications of unwanted program information (e.g. whether the program information identified as unwanted utilizing the driver is not actually unwanted) or whether the driver is identifying actual unwanted program information (e.g. malware).

Still yet, the server 402 may update the whitelist database 406 based on the analysis. For example, the server 402 may include an identifier of the driver in the whitelist database 406 if it is determined, based on the analysis, that the driver is making false positive identifications of unwanted program information. In this way, the current and subsequent identifications of program information as unwanted by such driver may be prevented from being verified by the server 402, if an identifier of the driver is included in the whitelist database 406.

It should be noted that while only a single client 404 is shown, the server 402 may be in communication with any number of different clients for communicating with such clients to allow verification of identifications by such clients of program information as unwanted. For example, the server 402 may communicate with each of the clients for verifying an identification of program information as unwanted that has been made by the client in the manner described above with respect to the client 404 shown in the present embodiment.

Figure 5:
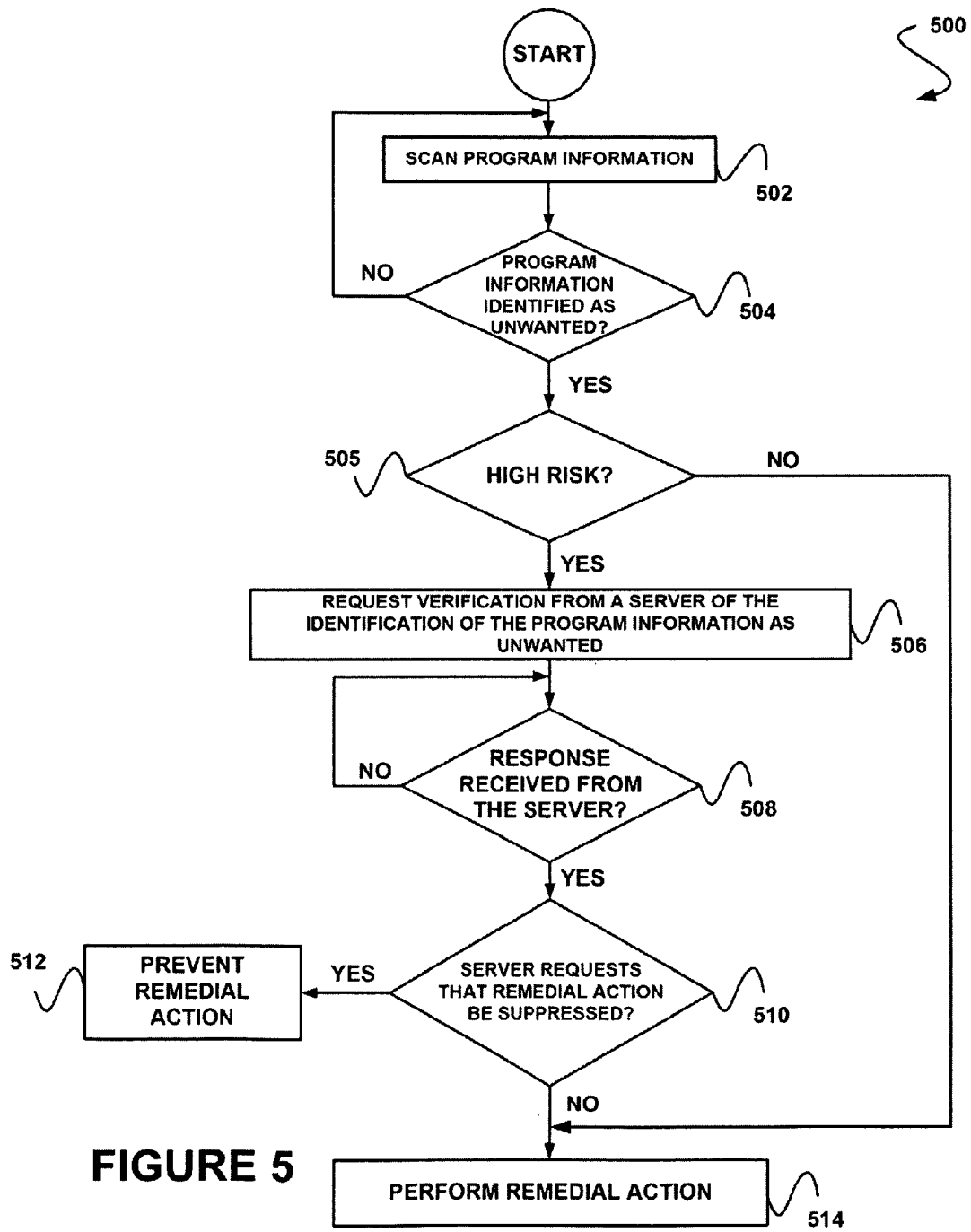
FIG. 5 shows a method for conditionally performing a remedial action based on a verification of an identification of program information as unwanted, in accordance with yet another embodiment.

FIG. 5 shows a method 500 for conditionally performing a remedial action based on a verification of an identification of program information as unwanted, in accordance with yet another embodiment. As an option, the method 500 may be carried out in the context of the architecture and environment of FIGS. 1-4. For example, the method 500 may be carried out utilizing the client 404 of FIG. 4. Of course, however, the method 500 may be carried out in any desired environment. It should also be noted that the aforementioned definitions may apply during the present description.

As shown in operation 502, program information is scanned. In one embodiment, the program information may include program information stored on a client, but of course may also include any program information accessed by the client. In another embodiment, the program information may be scanned by a security system installed on the client. For example, the program information may be scanned for identifying whether the program information is unwanted. As an option, scanning the program information may include comparing the program information to drivers indicative of known unwanted program information, unknown program information (e.g. program information for which it is unknown whether such program information is unwanted, program information which is determined to be suspicious, etc.), etc.

Additionally, it is determined whether the program information is identified as unwanted, as shown in decision 504. For example, it may be determined that the program information is identified as unwanted if it is determined that the program information matches any of the drivers that are indicative of known unwanted program information. As an option, the drivers may include signatures of known unwanted program information, such that it may be determined that the program information is identified as unwanted if it is determined that the program information matches one of such signatures. As another option, the drivers may include behavioral characteristics indicative of known unwanted program information, such that it may be determined that the program information is identified as unwanted if it is determined that the program information exhibits such behavioral characteristics.

As another example, it may be determined that the program information is not identified as unwanted if it is determined that the program information matches any of the drivers that are indicative of unknown program information. For example, such drivers may include signatures of unknown program information, such that it may be determined that the program information is not identified as unwanted if it is determined that the program information matches one of such signatures.

If it is determined that the program information is not identified as unwanted, the method 500 scans other program information (operation 502). If, however, it is determined that the program information is identified as unwanted, it is determined whether a risk factor associated with the identification of the program information is high. Note decision 505. Just by way of example, it may be determined whether the driver utilized to identify the program information as unwanted is assigned a high degree of risk. The high risk may include a risk that meets a predefined threshold, as an option.

If it is determined that the risk factor associated with the identification of the program information is not high, a remedial action is performed, as shown in operation 514. With respect to the present embodiment, the remedial action may include any action capable of remediating the program information identified as unwanted. For example, the remedial action may include preventing access to the program information, quarantining the program information, generating a notification to the client (e.g. indicating the identification of the unwanted program information), deleting the program information, cleaning the program information, restoring the program information, etc.

If it is determined that the risk factor associated with the identification of the program information is high, verification of the identification of the program information as unwanted is requested from a server, Note operation 506. In one embodiment, a request may be sent to the server with an identifier of the driver utilized to identify the program information as unwanted, such that the server may compare the identifier of the driver to a whitelist of drivers predetermined to be associated with false positive identifications of unwanted program information. In another embodiment, the whitelist stored on the server may be queried for the identifier of the driver utilized to identify the program information as unwanted.

In this way, the server may determine whether the identification of the program information as unwanted is verified (e.g. by determining whether the identifier of the driver is included in the whitelist, etc.). Moreover, as shown in decision 508, it is determined whether a response is received from the server. The response may include a response to the request for the verification of the identification of the program information as unwanted, with respect to the present embodiment.

If a response is not received from the server, the method 500 continues to wait for such a response. If it is determined that a response is received from the server, it is further determined whether the server requests that the remedial action be suppressed. Note decision 510. As an option, the response is received from the server be authenticated prior to determining whether the server requests that the remedial action be suppressed. For example, the response may be authenticated by verifying that the response includes a predetermined digital certificate unique to the server. Thus, it may optionally be verified that the response is actually received from the server instead of from a potentially malicious third party device.

In one embodiment, the server may request, via the response, that the remedial action be suppressed if the server determines that the identification of the program information as unwanted is not verified (e.g. that the identifier of the driver utilized to identify the program information as unwanted is included in the whitelist). In another embodiment, the server may request, via the response that, the remedial action not be suppressed (e.g. that the remedial action be allowed) if the server determines that the identification of the program information as unwanted is verified (e.g. that the identifier of the driver utilized to identify the program information as unwanted is not included in the whitelist).

If it is determined that the server requests that the remedial action be suppressed, the remedial action is prevented, as shown in operation 512. For example, the remedial action may be prevented by blocking the remedial action, or dropping an instruction for the remedial action, etc. As an option, the remedial action may be prevented to prevent a false positive (e.g. associated with the identification of the program information as unwanted).

If, however, it is determined that the server requests that the remedial action not be suppressed, the remedial action is performed. Note operation 514.

To this end, the remedial action may be conditionally performed based on the response received from the server. For example, the remedial action may be conditionally performed based on the verification of the identification of the program information as unwanted. As another example, the remedial action may only be performed if the program information is verified to be unwanted.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising instructions to cause one or more processors to:
    determine, at a client, program information is unwanted and to associate an indication of the unwanted determination with the program information;
    determine a risk factor associated with the determination of the program information as unwanted, wherein the risk factor indicates a degree of risk that the determination by the client will not be positively verified by a server;
    compare the risk factor to a threshold value, the comparison indicating an unacceptable degree of risk that the determination by the client will not be positively verified by a server;
    transmit the indication of the unwanted determination to the server based on the comparison; and
    receive a verification of the unwanted determination from the server.

2. The computer program product of claim 1, wherein the program information includes a file.

3. The computer program product of claim 1, further comprising instructions to cause the one or more processors to conditionally perform a remedial action responsive to a positive verification.

4. The computer program product of claim 3, wherein the remedial action includes at least one of preventing access to the program information, quarantining the program information, and generating a notification on the client.

5. The computer program product of claim 3, wherein the remedial action is only performed if the program information is verified to be unwanted.

6. The computer program product of claim 1, further comprising instructions to cause the one or more processors to conditionally prevent a remedial action when the verification of the determination is negative.

7. The computer program product of claim 1, wherein the risk factor is a function of a type of analysis that resulted in the determination of the program information as unwanted.

8. The computer program product of claim 1, wherein the risk factor is a function of an age of a driver that resulted in the determination of the program information as unwanted.

9. A computer program product embodied on a non-transitory computer readable medium comprising instructions to cause one or more processors to:
    receive a request from a client for verifying an identification by a client of program information as unwanted, wherein a degree of risk that the identification of program information as unwanted will not be positively verified by the server compares unfavorably to a threshold value, the comparison indicating an unacceptable degree of risk that the identification by the client will not be positively verified;
    verify the identification of the program information as unwanted; and
    send a response with an indication of a result of the verification.

10. The computer program product of claim 9, wherein the verification is performed utilizing a whitelist.

11. The computer program product of claim 10, further comprising instructions to cause the one or more processors to:
    receive, from the client, an identifier associated with the determination of the program information as unwanted; and
    search the whitelist for the identifier.

12. The computer program product of claim 9, further comprising instructions to cause the one or more processors to log information associated with the program information that is received from a plurality of clients.

13. The computer program product of claim 12, wherein the log information indicates a number of instances of the determination of the program information as unwanted across the plurality of clients.

14. A method, comprising:
    receiving, at a server, a request from a client for verifying an identification of program information as unwanted, wherein a degree of risk that the identification of program information as unwanted will not be positively verified by the server compares unfavorably to a threshold value, the comparison indicating an unacceptable degree of risk that the determination by the client will not be positively verified by a server;
    verifying whether the program information is unwanted, utilizing the server; and
    sending a response with an indication of a result of the verification.

15. The method of claim 14, wherein the server logs information associated with the program information that is received from a plurality of clients.

16. The method of claim 15, wherein the logged information indicates a number of instances of the identification of the program information as unwanted across the plurality of clients.

17. A system, comprising:
    a memory; and
    a processor coupled to the memory, the processor adapted to execute instructions stored in the memory to—
        receive a request from a client for verifying an identification by the client of program information as unwanted, wherein a degree of risk that the identification of program information as unwanted will not be positively verified by the server compares unfavorably to a threshold value, the comparison indicating an unacceptable degree of risk that the determination by the client will not be positively verified by a server;
verify the identification of the program information as unwanted; and
send a response with an indication of a result of the verification.

18. A system, comprising:

a memory; and a processor coupled to the memory by a bus, the processor adapted to execute instructions stored in the memory to— determine, at a client, program information is unwanted and associate an indication of the unwanted determination with the program information;

determine a risk factor associated with the determination of the program information as unwanted, wherein the risk factor indicates a degree of risk that the determination by the client will not be positively verified by a server;

compare the risk factor to a threshold value, the comparison indicating an unacceptable degree of risk that the determination by the client will not be positively verified by a server;

transmit the indication of the unwanted determination to the server based on the comparison; and receive a verification of the unwanted determination from the server.

* * * * *